United States Patent [19]

Hellio et al.

[11] Patent Number: 4,862,954

[45] Date of Patent: Sep. 5, 1989

[54] EXCHANGER AND METHOD FOR ACHIEVING HEAT TRANSFER FROM SOLID PARTICLES

[75] Inventors: Herveé Hellio, Torcy; Alain Feugier, Orgeval; Gérard Martin, Rueil Malmaison; Renaud Pontier, La Couture, all of France

[73] Assignees: Institut Francais du Petrole, Malmaison; Societe Fluidbi, Emerainville-Torcy, both of France

[21] Appl. No.: 814,752

[22] Filed: Dec. 30, 1985

[30] Foreign Application Priority Data

Dec. 28, 1984 [FR] France ................................ 84 10962

[51] Int. Cl.⁴ ........................ F28D 19/02; F28D 13/00
[52] U.S. Cl. ........................... 165/104.13; 165/104.16; 34/57 A; 122/4 D
[58] Field of Search ...................... 165/104.18, 104.16; 34/57 A; 122/4 D

[56] References Cited

U.S. PATENT DOCUMENTS

| 3,145,975 | 8/1964 | Towns, Jr. .......................... 34/57 A |
| 3,921,590 | 11/1975 | Mitchell et al. ................. 165/104.18 |
| 4,338,283 | 7/1982 | Sakamoto et al. . |
| 4,353,812 | 10/1982 | Lomas et al. .................... 165/104.18 |

FOREIGN PATENT DOCUMENTS

| 127902 | 11/1978 | Japan .................................. 122/4 D |
| 95193 | 6/1983 | Japan .............................. 165/104.16 |
| 1040283 | 9/1983 | U.S.S.R. .......................... 165/104.16 |
| 975513 | 11/1964 | United Kingdom ........... 165/104.16 |

Primary Examiner—Albert W. Davis, Jr.
Attorney, Agent, or Firm—Antonelli, Terry & Wands

[57] ABSTRACT

The present invention provides an exchanger and a method for achieving heat transfer between solid particles contained in an enclosure and the external environment.

The device comprises a main enclosure and several auxiliary compartments separate from each other and at least one of said compartments comprises its own fluidization means.

4 Claims, 4 Drawing Sheets

EXCHANGER AND METHOD FOR ACHIEVING HEAT TRANSFER FROM SOLID PARTICLES

BACKGROUND OF THE INVENTION

1. Field of the Invention

The present invention relates to an improved exchanger and a method for achieving heat transfer between solid particles contained or circulating in an enclosure and the external environment.

The present invention also relates to the use of the exchanger in the circulating loop of the solid particles in a circulating bed boiler.

2. Description of the Prior Art

The prior art devices are cumbersome and generally have, for equal volume, lower performances than those obtained by the device and process of the invention.

In U.S. Pat. No. 3,087,253, a device is proposed which requires a large exchange surface for there is no recirculation of the solid particles between the central enclosure and the rest of the device.

The prior art may be illustrated by the following patents: EP-A-0095427, EP-A-0006307, EP-A-0033713, EP-A-0093063, FR-A-2261497, FR-A-11 28881, GB-A-1577717, GB-A-1299264, GB-A-1248544, US-A-2842101, US-A-35650022, US-A-4404755, US-A-4538549, US-A-2759710, as well as by the article entitled "Les technologies de combustion en lit fluidisé" by R. DUMON published by A.I.M. Association des Ingénieurs Electriciens from the Montefiore Institute, on the occasion of the eighth session of the international, modern electric power station study days, held at Liège Oct. 26–30, 1981.

SUMMARY OF THE INVENTION

The exchanger of the present invention provides, more particularly, a great flexibility of heat transfers between solid particles and the external environment without for all that modifying the flow rate of the solid particles. The exchanger of the present invention has the following advantages:

great compactness linked with excellent heat exchange coefficients in the fluidized beds, a faculty of adjusting the exchange power required which may be obtained by considerable compartmentation or by using compartments of different sizes, homogeneity of the temperature in the fluidized bed even when it is fed with considerable amounts of solids, because of the presence of deflectors.

When it is used in a circulating bed boiler, the exchanger of the present invention allows greater simplicity of the whole of the external exchange and recirculation device with in particular a single point of reinjection of the ashes, great flexibility in use linked to the existence of two levers for controlling the powers exchanged as will be discussed more fully hereinbelow.

Thus, the present invention provides an improved exchanger allowing the transfer of heat energy between, more particularly, solid particles and the environment external to the exchanger, with the exchanger comprising inlet and outlet orifices for the particles. This exchanger comprises a main enclosure communicating with the inlet and outlet orifices, with the enclosure comprising fluidizing gas supply means and several auxiliary compartments, each of them comprising at least one orifice allowing the transfer of solid particles from the main enclosure to the auxiliary compartment concerned, at least one orifice allowing solid particles to be transferred from the auxiliary compartment to the main enclosure and means for supplying this compartment with fluidizing gas, these means allowing the solid particles to circulate in said compartment and means for extracting said heat energy.

This exchanger is also characterized in that one at least of said compartments comprises a device for controlling the flow rate of the fluidizing gas passing through said compartment.

The device for controlling the flow rate of the fluidizing gas may comprise a means adapted for all or nothing operation.

The exchanger of the invention may comprise a first and a second cylindrical casing, several side walls, a first and second plate, these two plates defining with said first casing a closed space in which said second cylindrical casing is housed, with the side walls extending between the cylindrical casings so as to define said auxiliary compartments.

The internal space defined by the second casing defines the main enclosure.

The second casing may comprise at least one orifice for admitting solid particles into one of the compartments; this admission orifice may comprise at least one deflector.

The first plate may comprise the fluidization gas supply means and the second cylindrical casing extending substantially from the first plate may stop before reaching the second plate, thus forming a free space between the edge of this casing and the second plate. This free space will serve as outlet orifice for the solid particles.

The exchanger of the present invention may comprise a first cylindrical casing containing a second cylindrical casing, at least one intermediate casing contained in the space defined by said first and second casings, a first and a second plate defining a closed space with the first casing. The internal space defined by the second casing defines the main enclosure and the annular spaces defined by the different cylindrical casings define the auxiliary compartments.

The energy extraction means may be coiled tubing.

Side walls may be situated between the annular spaces thus defining additional compartments.

The exchanger of the present invention may be advantageously used in a circulating bed boiler comprising a reactor and a separator.

The present invention also provides a method for controlling the heat transfer between solid particles contained in an enclosure and the external environment. This method is characterized in that the enclosure is divided into several zones and in tht the fluidization air supply of at least one of these zones is controlled separately.

BRIEF DESCRIPTION OF THE DRAWINGS

The present invention will be better understood and its advantages will be clearer from reading the following description of particular examples which are in no wise limitative, and which are illustrated by the accompanying drawings in which.

DESCRIPTION OF THE PREFERRED EMBODIMENTS

Figure 1A:
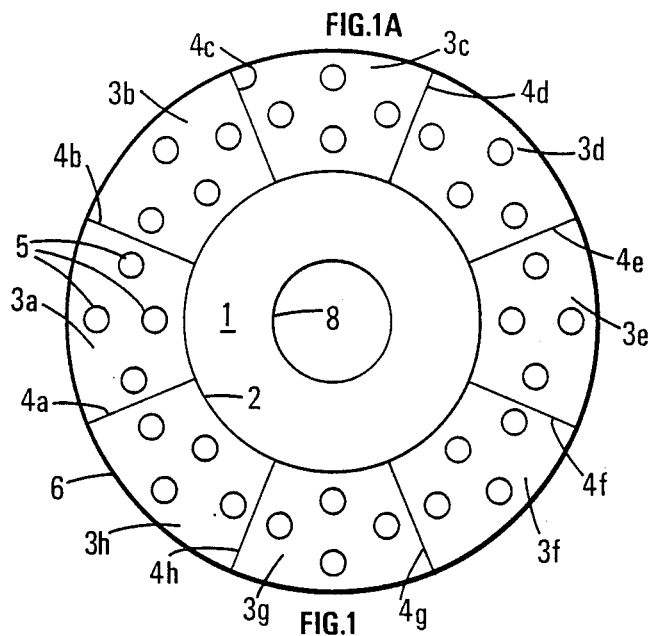
FIG. 1A is a cross-sectional view taken along the line A—A in FIG. 1
Figure 1:
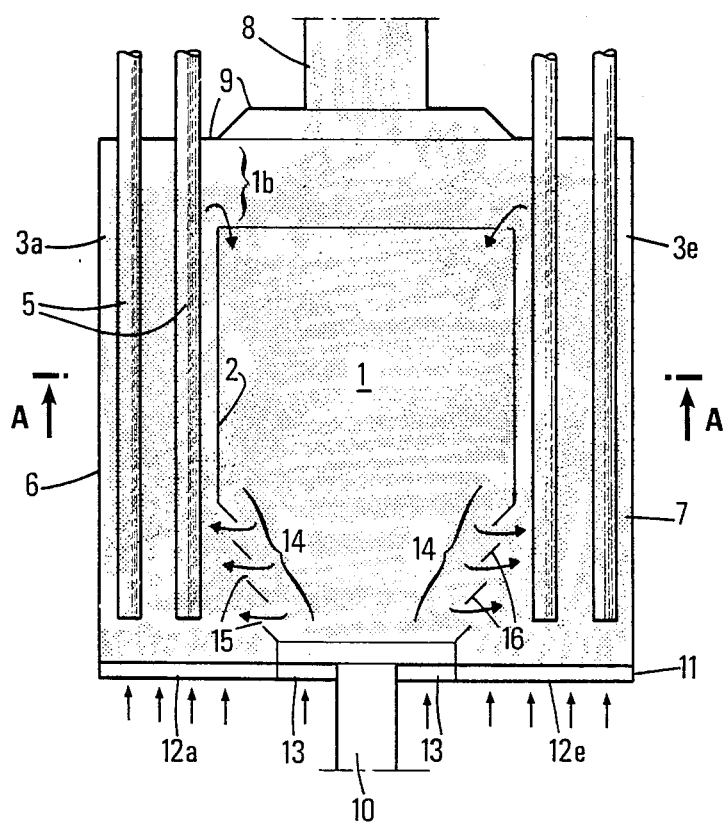
FIG. 1 is a partially schematic view of one embodiment of a heat exchanger constructed in accordance with the present invention.

Referring now to the drawings where like reference numerals are used throughout the various views to designate like parts and, more particularly, to FIG. 1, according to this figure, a heat exchanger constructed in accordance with the present invention comprises a main enclosure defined by a cylindrical casing 2.

As shown most clearly in FIG. 1A, auxiliary compartments 3a, 3b, 3c, 3d, 3e, etc . . . are defined by side walls 4a to 4f and an external cylindrical casing 6.

Each auxiliary compartment comprises heat energy transfer means such as exchanger tubes 5 in which a heat carrying fluid may flow. It should be noted that these heat transfer means may either bring heat energy to the solid particles or, on the contrary, remove heat therefrom.

In the case of the embodiment shown in FIG. 1, the solid particles 7 penetrate into the main enclosure 1 through the orifice 8 formed n the plate, or cap 9 which closes the exchanger at its upper part, while letting tubes 5 pass therethrough.

The solid particles 7 leave again through the orifice 10 formed in plate 11, or bottom, which closes the exchanger at its lower part. Of course, without departing from the present invention, the orifices for introducing and removing solid particles may be located at other positions.

In FIG. 1, the bottom 11 of the exchanger comprises the fluidization grids 12a, 12e and 13 of the auxiliary compartments 3a and 3e and of the main compartment 1, respectively.

The arrows shown at the lower part of FIG. 1 symbolize the fluidization gas.

The cylindrical casing 2 is completed at its lower part by a truncated cone shaped metal sheet 14 which comprises orifices 15 allowing solid particles to penetrate into the different auxiliary compartments. These orifices 15 may be advantageously provided with deflectors 16.

The cylindrical casing 2 does not extend as far as cap 9 and stops before so as to leave a free space 1b for the circulation of the solid particles 7, by overflow.

In FIG. 1, the auxiliary compartments have the form of a right prism whose base has the shape of an annular disk sector.

Still within the scope of the present invention, compartments of other forms may be provided.

Figure 2A:
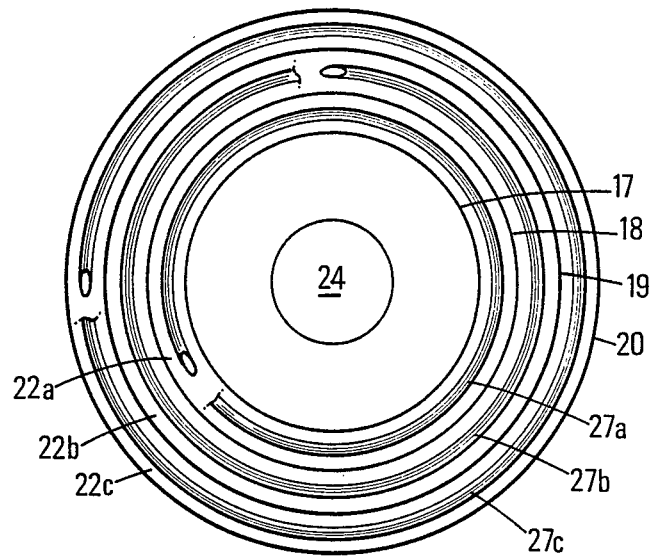
FIG. 2A is a cross-sectional view taken along the line A—A in FIG. 2.
Figure 2:
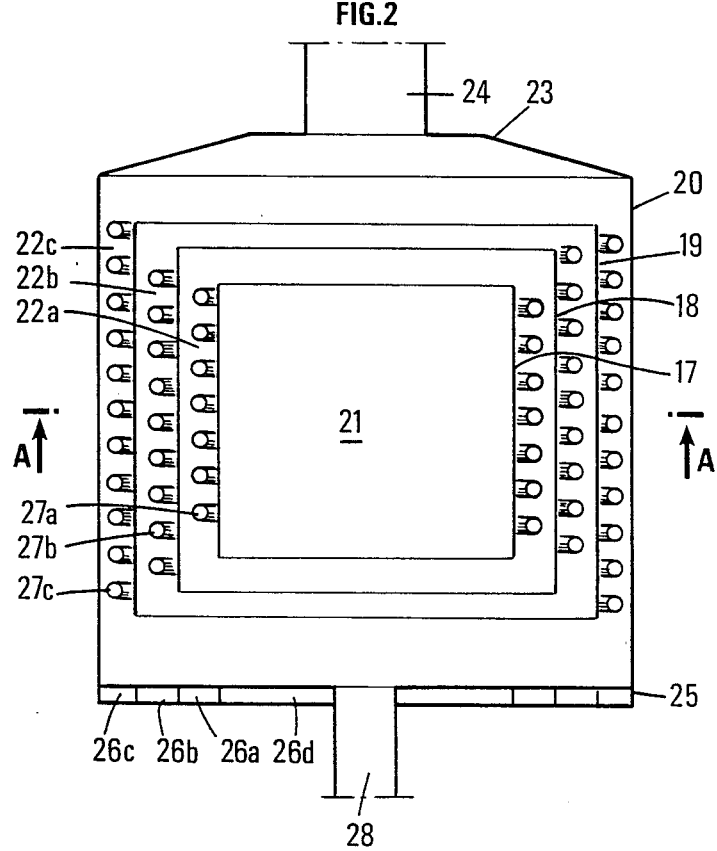
FIG. 2 is a partially schematic view of another embodiment of a heat exchanger constructed in accordance with the present invention.

In the embodiment of FIG. 2, the heat exchanger of this new embodiment is defined by a first cylindrical external casing 20 and comprises a main enclosure 21 defined by a second cylindrical casing 17.

The annular space between the first cylindrical casing 20 and the second cylindrical casing 17 comprises intermediate cylindrical casings 19 and 18. Thus, as shown in FIG. 2a three auxiliary compartments 22a, 22b and 22c are defined.

The exchanger of FIG. 2 comprises a cap 23 in which is provided an orifice 24 for admitting solid particles and a bottom 25 equipped with an orifice 28 for discharging the solid particles and fluidization means 26a, 26b and 26c for the auxiliary compartments and fluidization means 26d for the main enclosure.

The heat energy transfer means are formed from coiled exchanger tubes 27a, 27b, 27c in the different auxiliary compartments.

Of course, still within the scope of the present invention, the annular compartments 27a, 27b and 27c may comprise side walls creating subcompartments; in this case, the exchanger tube may not be completely coiled around the cylindrical casings.

The different ways in which the cylindrical casings may be fixed in the exchanger will not be described in this text, since these techniques are well known to a man skilled in the art.

Figure 3:
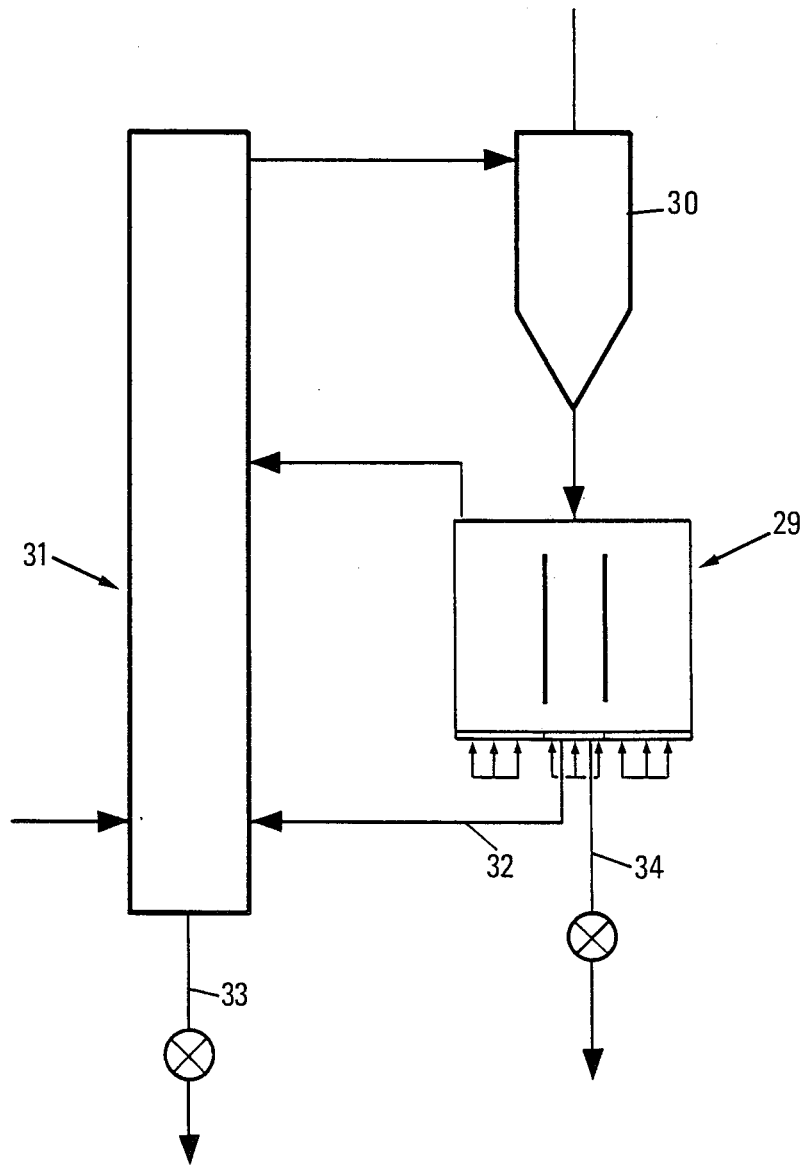
FIG. 3 is a schematic view illustrating an integration of the heat exchanger of the present invention into a circulating bed boiler.

As shown in FIG. 3, the exchanger of the present invention is inserted between the cyclone 30 and the device for reinjecting ashes into the reactor 31. It allows the particles captured by the cyclone 30 to be fluidized and a part of their perceptible heat to be removed therefrom by means of vaporizer tubes immersed in the bed. The heat exchange coefficients in this medium are very high, in particular if they are compared with those obtained with devices having mobile beds or particles shower beds. The powers exchanged per unit of tube surface are three to six times higher than those obtained with non fluidized exchangers.

The exchanger has the advantage of being able to be fed continuously with the captured ashes and to withstand very high recirculation flow rates.

The vaporizer tubes are placed in auxiliary compartments separated from each other and in communication with a main enclosure. This latter feeds the auxiliary compartments with hot solids. The exchange of solids between the main enclosure and the auxiliary compartments is facilitated by the presence of deflectors 16 which induce intense circulation currents and by using differenciated fluidization air distributors which cause greater ventilation within the auxiliary compartments. With this configuration the temperature throughout the whole of the exchanger may be held constant even when the exchanger has very considerable amounts of solids passing therethrough.

The power of the installation may be modulated by adjusting the temperature or the exchange surface in contact with the fluidized medium. With constant solid particle temperature and constant exchange surface, the temperature of the fluidized bed increases with the solid flow rate. So, controlling the solid flow rate through the exchanger is a means of controlling the thermal power. In the majority of cases, a flexibility of the order of two may be hoped for.

The power may also be reduced by defluidizing some of the auxiliary compartments: the exchanger tubes are then plunged in a fixed bed for which the exchange coefficients are ten to twenty times lower than those of the compartments. This technique corresponds then to neutralizing a part of the exchange surface.

Defluidization of one compartment is achieved by cutting off the air supplying the distributor. Each fluidization caisson may be equipped with an all or nothing valve. The number of compartments is determined as a function of the flexibility required of the exchanger.

Through defluidization, a flexibility of one to ten may be expected and by combining defluidization and control of the temperature of the solids, the overall flexibility of the exchanger is from one to twenty if the supply of fluidization air to the auxiliary compartment is of the all or nothing type. The power variations of the exchanger will therefore be all the more flexible the larger the number of these compartments.

In FIG. 3, the whole of the solids flowing in the loop pass through the exchanger 29, and the reinjection device, which may be of L valve type 32, is the only one. This configuration, like any configuration using an external exchanger, assumes that the flow of solids which escape the cyclones still remains less than the elementary flow of non combustible materials. Since this situation is not necessarily acquired in all cases, it is desirable to provide a device for reinjecting solids captured by the boiler from smoke, even by filters.

In normal operation, i.e. without solid impoverishment of the circulation loop, two tapping devices allow the overall inventory and the grain size of the charge to be checked. The tapping point 33, situated at the base of the reactor, allows the large particles to be removed, and tapping point 34, situated under the external exchanger 19, allows the fine particles to be removed.

The operator of installations similar to the one shown in FIG. 3 has two parameters available for varying the power exchanged:
 the recycling rate,
 the fluidization or defluidization of the compartments of the external exchanger 29.

This allows the operation of the boiler to be better optimized for all its operating ratings.

As a first approximation and for a reactor operating at a temperature of 850° C., the powers exchanged have the followingrelationships.

Internal exchanger $E_1$ situated in the reactor, $$P_1 = h_1 \cdot S_1 (850 - T_t).$$

External exchanger $E_2$ $$P_2 = h_2 \cdot S_2 (T_r - T_t)$$

where
 $T_t$: tube skin temperature in degrees Celsius,
 $T_r$: recycling temperature in degrees Celsius,
 $h_i$: heat exchange coefficient of the exchanger i,
 $S_i$: exchange surface of the exchanger i.

Any action on the recycling flow results in modifying the exchange coefficient $h_1$, but also $T_r$ as a heat test carried out on the external exchanger shows:

$$Q_E C_{ps}(850-T_o) = h_2 \cdot S_2 \cdot (T_r - T_t) + Q_S \cdot C_{ps}(T_r - T_o)$$

with
 $Q_E$: mass flow rate of incoming solids,
 $C_{ps}$: specific heat of the solids,
 $Q_S$: mass flow rate of outgoing solids,
 $T_o$: reference temperature.

Under stable operating conditions, the incoming and outgoing flow rates are equal ($Q_E = Q_S$).

So:

$$Q_S \cdot C_{ps} \cdot (850 - T_r) = h_2 \cdot S_2 \cdot (T_r - T_t)$$

-continued $$T_r = \frac{\frac{Q_S \cdot C_{ps}}{h_2 \cdot S_2} \cdot 850 + T_t}{\frac{Q_S \cdot C_{ps}}{h_2 \cdot S_2} + 1}$$

The power exchanged by the external exchanger is therefore $$P_2 = h_2 \cdot S_2 \cdot (850 - T_t)\left(1 - \frac{1}{\frac{Q_S \cdot C_{ps}}{h_2 \cdot S_2} + 1}\right)$$

It increases with the solid flow rate $Q_S$ to reach the maximum value $$P_{2\infty} = h_2 \cdot S_2 (850 - T_t)$$

An example of application is given hereafter:
The desired distribution of powers is the following:
Internal exchanger: 3.53 MW
External exchanger: 3.72 MW
Boiler on smoke: 7.21 MW.
The essential element in dimensioning the exchange surfaces is the determination of the recirculation rates under nominal operating conditions and reduced operating conditions.
Bases of calculation:
nominal operation:
Recirculation rate: 50
Circulating flow rate: 215 t/h
Exchange coefficient in the reactor: 135 W/m².K
reduced operation 1 (no defluidization of the external exchanger):
Recirculation rate: 10
Circulation flow rate: 21.5 t/h
Exchange coefficient in the reactor: 70 W/m².K
reduced operation 2 (complete defluidization of the external exchanger):
Recirculation rate: 5.4
Circulation flow rate: 5.0 t/h
Exchange coefficient in the reactor: 60 W/m².K
The exchange coefficient in the external exchanger is assumed constant and equal to 300 W/m².K.
From these elements, $E_1$ and $E_2$ can be dimensioned.
Exchanger $E_1$: $S_1 = 43.5$ m² with $\Delta T$ of 600° C.
Exchanger $E_2 = T_2 = 785°$ C.
$S_2 = 23$ m² with a $\Delta T$ of 535° C.
In reduced operation 1, the exchanged powers are:
Exchanger $E_1$: $P_1 = 1.83$ MW
Exchanger $E_2$: $T_2 = 522°$ C. $P_2 = 1.88$ MW
Flexibility achieved: 2
In reduced operation 2, the exchanged powers are:
Exchanger $E_1$: $P_1 = 1.57$ MW
Exchanger $E_2$: $P_2 = 0$
Flexibility achieved: 4.6

Figure 4:
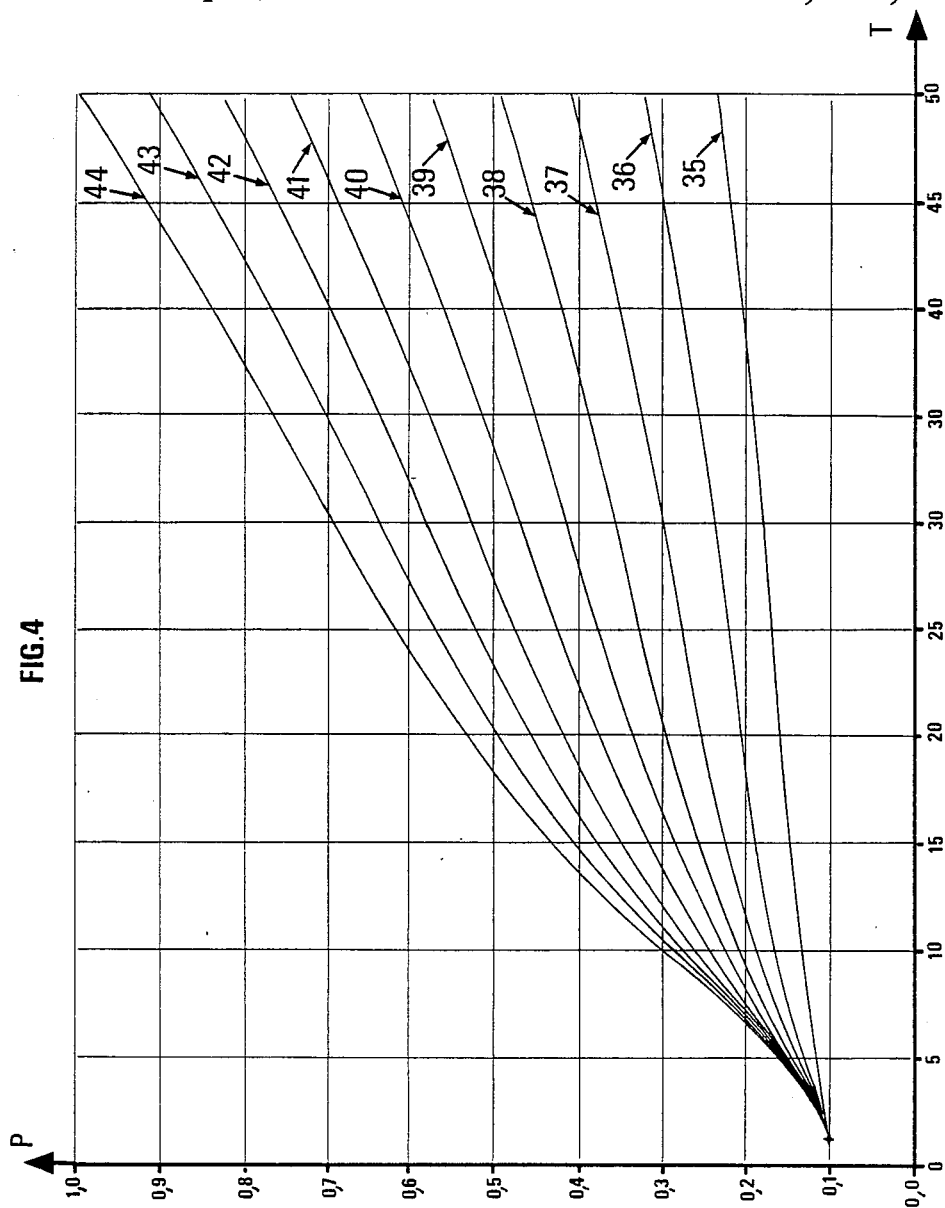
FIG. 4 is a graphical illustration of operating curves.

FIG. 4, graphically depicts the possibilities of adjustment due to the integration of an external exchanger of the present invention in a circulating bed boiler loop. In FIG. 4, the abscissa is the recirculation rate T, equal to the circulation flow rate of the solids divided by the flow rate of fuel fed into the boiler, and the ordinate is the total power P taken off from solids in such a loop divided by the nominal power taken off from solids.

The external exchanger 10 comprises compartments of equal sizes.

Curves 35 to 43 correspond to bringing into operation one, then two, then three compartments up to the total number of such compartments.

Still within the scope of the present invention, the different compartments may have different shapes and a different arrangement from those shown in the present description, particularly if the compartments are aligned.

What is claimed is:

1. An improved heat exchanger for transferring heat energy between solid particles and an environment external to said heat exchanger, comprising inlet and outlet orifices for said solid particles, a first cylindrical casing, a second cylindrical casing, said first cylindrical casing accommodating said second cylindrical casing for defining a single main enclosure communicating with said inlet and outlet orifices, said enclosure comprising a fluidization gas supply means and several auxiliary compartments contained in said first cylindrical casing, each of said auxiliary compartments comprising at least one orifice for transferring solid particles from said enclosure to said compartment, at least one orifice for transferring solid particles from said compartment to said enclosure, and means for supplying said compartment with fluidization gas, said means providing circulation of said solid particles in said compartment and means for removing said heat energy, and at least one of said compartments comprising a device for controlling the flow of fluidization gas passing into said compartment; several side walls, a first and second plate, said first and second plate defining with said first cylindrical casing a closed space in which said second cylindrical casing is accommodated, said side walls extending between said first and second cylindrical casings to define said auxiliary compartments, an external face defined by the second cylindrical casing defining said main enclosure; said second cylindrical casing comprising at least one orifice for admitting particles into one of the auxiliary compartments, which admission orifice comprises at least one deflector.

2. The heat exchanger as claimed in claim 1, wherein said device for controlling the flow of fluidization gas comprises a means adapted for all or nothing operation.

3. The heat exchanger as claimed in claim 1, wherein said first plate comprises said fluidization gas supply means and said second cylindrical casing which extends substantially from the first plate stops before reaching the second plate, thus forming a free space between the edge of this casing and the second plate, said free space serving as outlet orifice for the solid particles.

4. A circulating bed boiler comprising a reactor, a separator, and a heat exchanger according to claim 4 for transferring heat energy between solid particles and an environment external to said heat exchanger.

* * * * *